March 27, 1928.
E. M. BECKER
CULTIVATOR
Filed Nov. 12, 1926
1,664,344
2 Sheets-Sheet 1
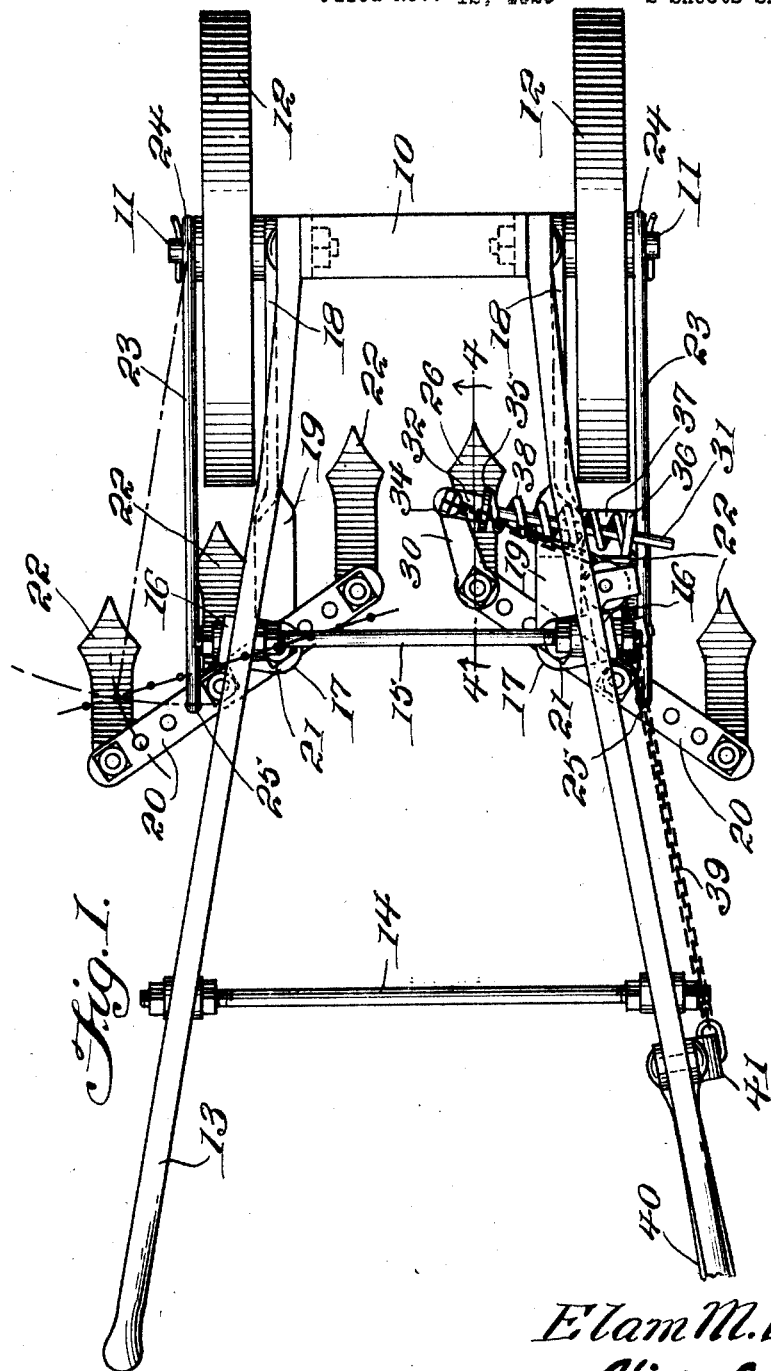

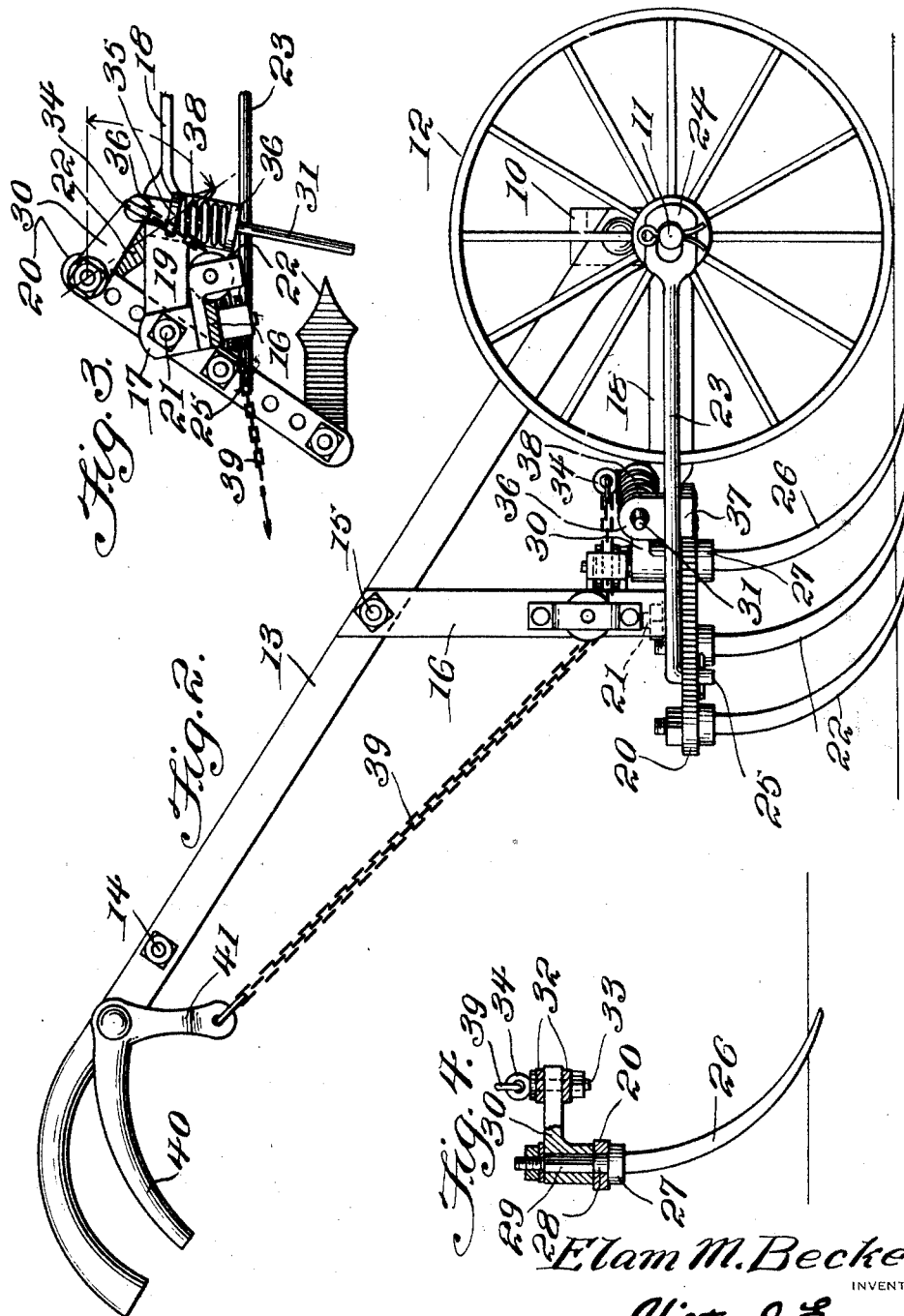

Patented Mar. 27, 1928.

1,664,344

UNITED STATES PATENT OFFICE.

ELAM M. BECKER, OF LITITZ, PENNSYLVANIA.

CULTIVATOR.

Application filed November 12, 1926. Serial No. 148,051.

This invention has particular relation to row cultivators embodying among other characteristics means for shifting the hoes therefor to one side when encountering a plant whereby the usual necessity of lifting the cultivator over a plant to prevent injury thereto by the hoes is obviated.

Another object of the invention contemplates an arched wheel supporting apparatus to permit unrestricted operation of the cultivator over the plants.

More specifically stated the operating means consists of means for retracting the same to a normal position subsequent to passing a plant.

With the above and other objects in view, the invention further consists of the following novel features and details of construction to be hereinafter more fully described, illustrated in the accompanying drawings and pointed out in the appended claims.

In the drawings:

Figure 1 is a top plan view of the invention.

Figure 2 is a side elevation thereof.

Figure 3 is a top plan view of the operating mechanism.

Figure 4 is a sectional view taken on line 4—4 of Figure 1.

Referring to the drawings in detail, wherein like characters of reference denote corresponding parts, the reference character 10 indicates an arched member having oppositely and outwardly disposed trunnions 11 upon the ends thereof. Wheels 12 are journaled upon said trunnions. Handle members 13 are carried upon the opposed sides of the arched member 10 and which include brace bars 14 and 15 to relatively space the same.

Vertically disposed plates 16 carried upon the outer sides of the handle members 13 and upon the extremities of the brace bar 15 terminate to provide inwardly offset portions 17, the purpose of which will be presently apparent. Plates 18 carried upon the outer sides of the arched member 10 terminate to provide twisted portions 19 adapted to lie flush with the offset portions 17. Elongated and apertured tooth bars 20 are carried by bolts 21 passed through the offset portions 17 of the plates 16 and the flattened portions 19 of the plates 18, in the manner as clearly illustrated in Figure 3 of the drawings. Teeth or hoes 22 are carried by the bars 20. Rods 23 providing flattened and apertured forward end portions 24 are carried upon the outer extremities of the trunnions 11 while the innermost ends thereof form downwardly offset portions 25 which are dropped within any one of the plurality of openings in the tooth bars 20 to alter the angular positions of said bars and the teeth 22 carried thereby.

The invention as previously described and illustrated comprehends a device adapted for cultivating rows, a provision being made, through the instrumentality of the rods 23 to relatively space the innermost of the teeth as carried by the respective bars 20.

In order to more effectively and to simultaneously, relatively space the innermost of the teeth during the operation and transit of the cultivator, I provide an auxiliary tooth 26 providing a shoulder 27, a rounded portion 28 extended through an apertured portion of the particular tooth bar 20 and terminating in a squared shank 29. A crank arm 30 receiving the squared shank 29 of the tooth 26 is adapted for simultaneous oscillatory movement therewith. A bolt 31 forming bifurcated ears 32 upon the inner end thereof receives the outer end of the crank arm 30 which in turn have passed therethrough a bolt 33 including a ring 34 upon the upper end thereof. A collar 35 is carried by the bolt 31 between the same and the ears 32 carried thereby. The remaining length of the bolt is passed through the upstanding portion 36 of an L-shaped plate 37. A compression spring 38 encircles that portion of the bolt 31 between the collar 35 and upstanding portion 36 of the L-shaped plate 37. The normal position of the tooth 26 is illustrated in Figure 1 of the drawings and the active position in Figure 3. A chain 39 is passed over oppositely disposed pulleys carried by one of the vertically disposed plates 16 and connected with the ring 34 carried by the bolt 33. An operating lever 40 pivotally mounted adjacent the handle portion of one of the handle members 13 provides a depending arm 41 connected with the uppermost end of said chain 39.

In carrying out the invention the cultivator is manipulated in the usual manner; the operating lever 40 is grasped with the adjacent gripping portion of an adjacent handle member 13. Plants cultivated in rows and when passed beneath the arched portion 10 may have a spread greater than that of the space between the innermost of the teeth 22 and 26 respectively. In such instances the operating lever 40 is compressed to exercise a pull upon the chain 39 which due to its operative connection with that of the bolt 33 the crank arm 30 will be thrust outwardly with the tooth 26 against the tension of the spring 38 to allow said plant to pass between the innermost of the teeth without injury. When the plant has been passed the operating lever 40 is released and the spring 38 will automatically retract the tooth 26 to its normal position.

The invention is susceptible of various changes in its form, proportions, and minor details of construction and the right is herein reserved to make such changes as properly fall within the scope of the appended claims.

Having thus described my invention what is claimed is:

1. A row cultivator comprising a frame, tooth bars and teeth therefor pivotally mounted upon the frame, rods carried by the frame adapted for connection with the tooth bars to alter the pitch thereof, an auxiliary tooth pivotally mounted for independent lateral swinging movement upon the inner end of one of the toothed bars, and an operating means carried by the frame having connection with the auxiliary tooth.

2. A row cultivator comprising a frame member provided with tooth bars and teeth therefor, an auxiliary tooth pivotally mounted for independent lateral swinging movement upon the inner end of one of the tooth bars, an arm carried by the auxiliary tooth, a bolt member pivotally connected therewith, a plate member provided with an upstanding portion adapted to receive the bolt member, a compression spring encircling the bolt and abutting one end of the bolt and the adjacent side of the upstanding portion of the plate member to normally hold the auxiliary tooth member in position for use, and an operating means carried by the frame being operatively engaged with the auxiliary tooth to impart lateral shifting movement thereto.

ELAM M. BECKER.